United States Patent [19]

Boyland

[11] 4,426,184
[45] Jan. 17, 1984

[54] BAG PALLETIZER

[75] Inventor: Ernest E. Boyland, North Little Rock, Ark.

[73] Assignee: Quikstak, Inc., Little Rock, Ark.

[21] Appl. No.: 327,443

[22] Filed: Dec. 4, 1981

[51] Int. Cl.³ .................... B65G 57/10; B65G 57/24
[52] U.S. Cl. .................................. 414/82; 414/101; 414/131; 414/786; 414/903
[58] Field of Search ............... 414/82, 85, 101, 131, 414/786, 903; 198/746

[56] References Cited

U.S. PATENT DOCUMENTS

| | | | |
|---|---|---|---|
| 3,050,199 | 8/1962 | McGrath et al. | 414/101 X |
| 3,402,830 | 9/1968 | Copping et al. | 414/101 X |
| 3,420,385 | 1/1969 | Verrinder | 414/101 X |
| 3,844,422 | 10/1974 | Smith et al. | 414/101 X |
| 3,877,584 | 4/1975 | Holcombe | 414/101 X |
| 3,954,190 | 5/1976 | Howard et al. | |
| 4,030,618 | 6/1977 | Kelley et al. | 414/101 X |
| 4,277,217 | 7/1981 | Miller et al. | 198/746 X |

FOREIGN PATENT DOCUMENTS 28133  6/1956  Finland ........................... 414/131

Primary Examiner—Leslie J. Paperner
Attorney, Agent, or Firm—Richards, Harris & Medlock

[57] ABSTRACT

A bag palletizer (20) includes a support frame (22) including a pallet magazine (24) for maintaining a stack of pallets therein. A loading plate (160) is mounted for reciprocating movement relative to the frame and is movable between a retracted position below the pallets in the magazine to an extended position. A wedge (280) and an actuating arm (270), both attached to the loading plate, cooperate to engage the lowermost pallet prior to movement of the plate to its extended position such that the lowermost pallet is drawn from the magazine when the loading plate is extended and is deposited onto a vertically movable fork assembly (200) positioned immediately below the loading plate. The loading plate may be extended to a position immediately above the pallet, and bags of material are loaded on the loading plate. By retracting the loading plate the bags are deposited onto the pallet therebelow. A plurality of layers of bags is stacked on the pallet with the fork assembly (200) being lowered as each layer of bags is positioned thereon.

23 Claims, 7 Drawing Figures

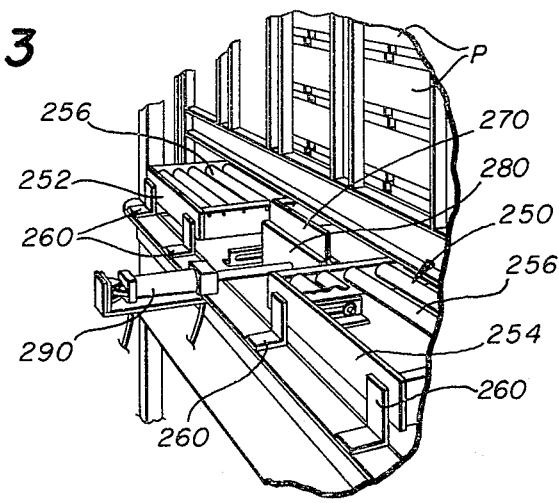
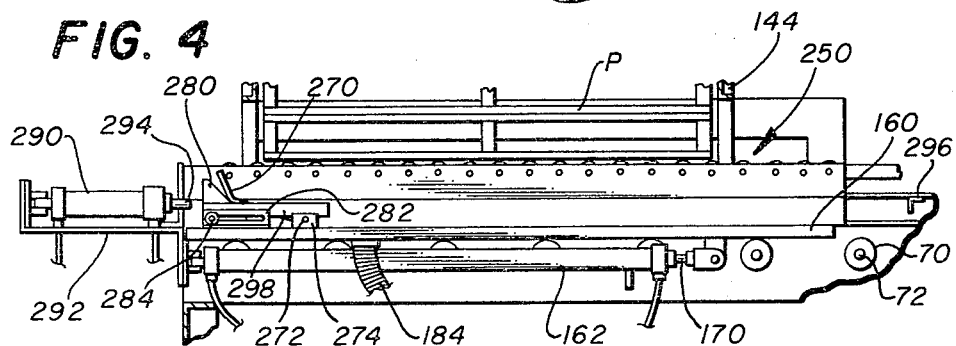
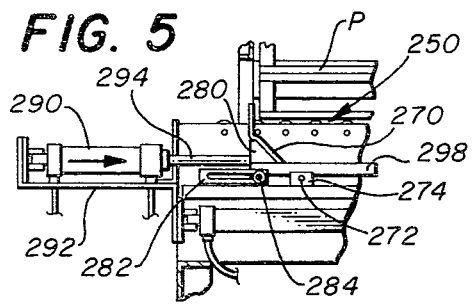
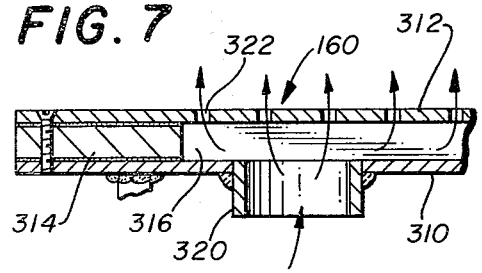
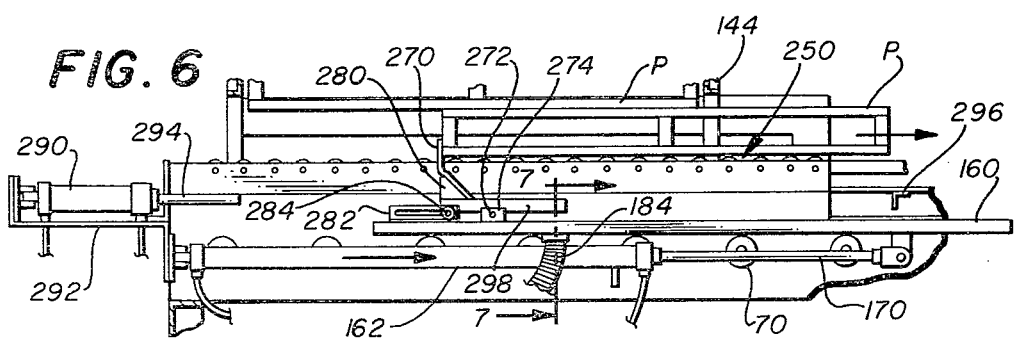

BAG PALLETIZER

TECHNICAL FIELD

The present invention relates to a method and apparatus for loading bagged material onto a pallet, and more specifically, to such a method and apparatus which is semiautomatic.

BACKGROUND ART

Bagged material is often loaded onto pallets to facilitate the movement and shipping of a quantity of bags from location to location. Apparatus have been developed to assist in this loading process, but such apparatus have normally required large and complex machinery. Where simplification of such apparatus has been attempted, the process of loading bags onto the pallet has been slowed and has required several manual steps which in the larger, more complex machinery has been automated.

Examples of earlier palletizing machines are found in U.S. Pat. No. 3,624,782, to McPeek, et al., issued Nov. 30, 1971; U.S. Pat. No. 3,844,422, to Smith, et al., issued Oct. 29, 1974; U.S. Pat. No. 4,030,618, to Kelley, et al., issued June 21, 1977; and U.S. Pat. No. 4,274,780 to Kaul, et al., issued June 23, 1981. While these devices provide systems for assisting in loading bagged material onto pallets, the devices are, in many cases, complex and in other respects do not adequately automate the work involved in completing the loading process. For example, none of the references to McPeek, et al., Kelley, et al. or Kaul, et al. disclose a satisfactory arrangement for providing a plurality of pallets for selective use during the palletizing process. While the Smith, et al. patent discloses having a stack of pallets adjacent to the loading apparatus, the arrangement for positioning the pallet for receiving the load thereon is one that requires substantial complexity in parts and components.

SUMMARY OF THE INVENTION

The present invention provides a new method and apparatus for loading bagged material onto pallets which are simple and efficient in operation. In the primary embodiment of the invention, the bag palletizer includes a support frame including a pallet magazine for maintaining a stack of pallets therein. A loading plate is mounted for reciprocating movement relative to the frame and is movable between a retracted position below the pallets in the magazine to an extended position. Structure is provided on the loading plate for engaging the lowermost pallet prior to movement of the plate to its extended position such that the lowermost pallet is withdrawn from the magazine when the loading plate is moved to its extended position.

The pallet is initially received on the loading plate and by retracting the loading plate, the pallet is deposited onto a fork support positioned immediately below the loading plate. The fork support is vertically movable between an upper position immediately below the loading plate and a lower position. By lowering the fork support, the loading plate may be extended to take a position immediately above the pallet and bags of material are loaded on the loading plate. By retracting the loading plate, while preventing the movement of the bags loaded thereon, the bags are deposited onto the pallet therebelow.

In one embodiment of the invention, the loading plate is formed with an inner chamber having a top surface with apertures therein. Compressed air is communicated to the inner chamber and through the apertures in the top surface to provide an air cushion on which both the bags of material and pallet move as they are positioned on the loading plate. This arrangement facilitates the retraction of the loading plate and the deposit of the pallet onto the fork and, in a subsequent step, the deposit of bags of material onto the pallet.

In the present invention, with the loading of each layer of bags onto the pallet, the fork support is lowered such that the upper layer of bags is below the path of movement of the support plate. The support plate is extended over the pallet and an additional layer of bags is loaded onto the plate. With the loading of the layer of bags on the support plate completed, the plate is retracted and the layer of bags deposited onto the bags positioned on the pallet therebelow. This sequence is repeated until a desired number of bags is loaded onto the pallet. The fork assembly is then lowered such that the pallet is loaded on live rollers which move the loaded pallet away from the apparatus to a position for subsequent handling.

At its lowermost travel, the fork structure actuates a controller. This controller operates a hydraulic cylinder for moving structure on the loading plate to engage the then lowermost pallet in the magazine of pallets for withdrawal therefrom. The fork structure is raised to its upper position immediately below the path of movement of the loading plate. The sequence described above is repeated with the loading plate being extended to draw a pallet from the magazine rack. Upon retraction of the loading plate, the pallet is deposited on the fork structure as earlier described. It will be appreciated that the loading of the pallet on the fork structure occurs when the fork structure is at its upper position. Thus, the pallet may be retracted from the magazine rack and positioned on the loading plate while the fork structure is moving from its lower position to the upper position. Further, it will be appreciated that the loading plate serves both to remove the pallets from the magazine rack, as well as to receive bags of material thereon for loading onto a pallet once the pallet is loaded onto the fork support. A plurality of pallets is also positioned in the magazine rack, thereby eliminating the need to manually load a pallet into the apparatus.

It will be appreciated that the steps of the present operation may be semiautomatic in that actuation of the structure for engaging the lowermost pallet and withdrawing the pallet from the magazine rack is triggered by engagement of a controller by the fork support as it moves to its lower position and unloads the loaded pallet. Movement of the loading plate from its retracted to its extended position may be controlled either manually or automatically. The withdrawal of the loading plate will normally be by manual control. However, lowering of the fork support is done automatically with an appropriate light sensor indicating when the fork has lowered sufficiently such that either the pallet or uppermost layer of bags is slightly below the path of travel of the loading plate.

In the preferred embodiment of the invention, the loading plate is reciprocated from its retracted to its extended position by linear actuators, such as hydraulic cylinders. The fork support has a plurality of parallel, horizontally supported arms which are moved vertically by an appropriate linear actuator such as a hydraulic cylinder.

BRIEF DESCRIPTION OF THE DRAWINGS

For a more complete understanding of the present invention, and for further details and advantages thereof, reference is now made to the following description taken in conjunction with the accompanying drawings, in which:

FIG. 3 is a perspective view showing the mechanism for engaging the lowermost pallet in the pallet magazine;

FIG. 4 is a vertical section view of a portion of the pelletizer according to the present invention;

FIGS. 5 and 6 are views similar to FIG. 4 but showing the loading plate moving from its retracted to its extended position drawing a pallet from the pallet magazine; and FIG. 7 is a section view taken along lines 7—7 in FIG. 6.

DETAILED DESCRIPTION

Figure 1:
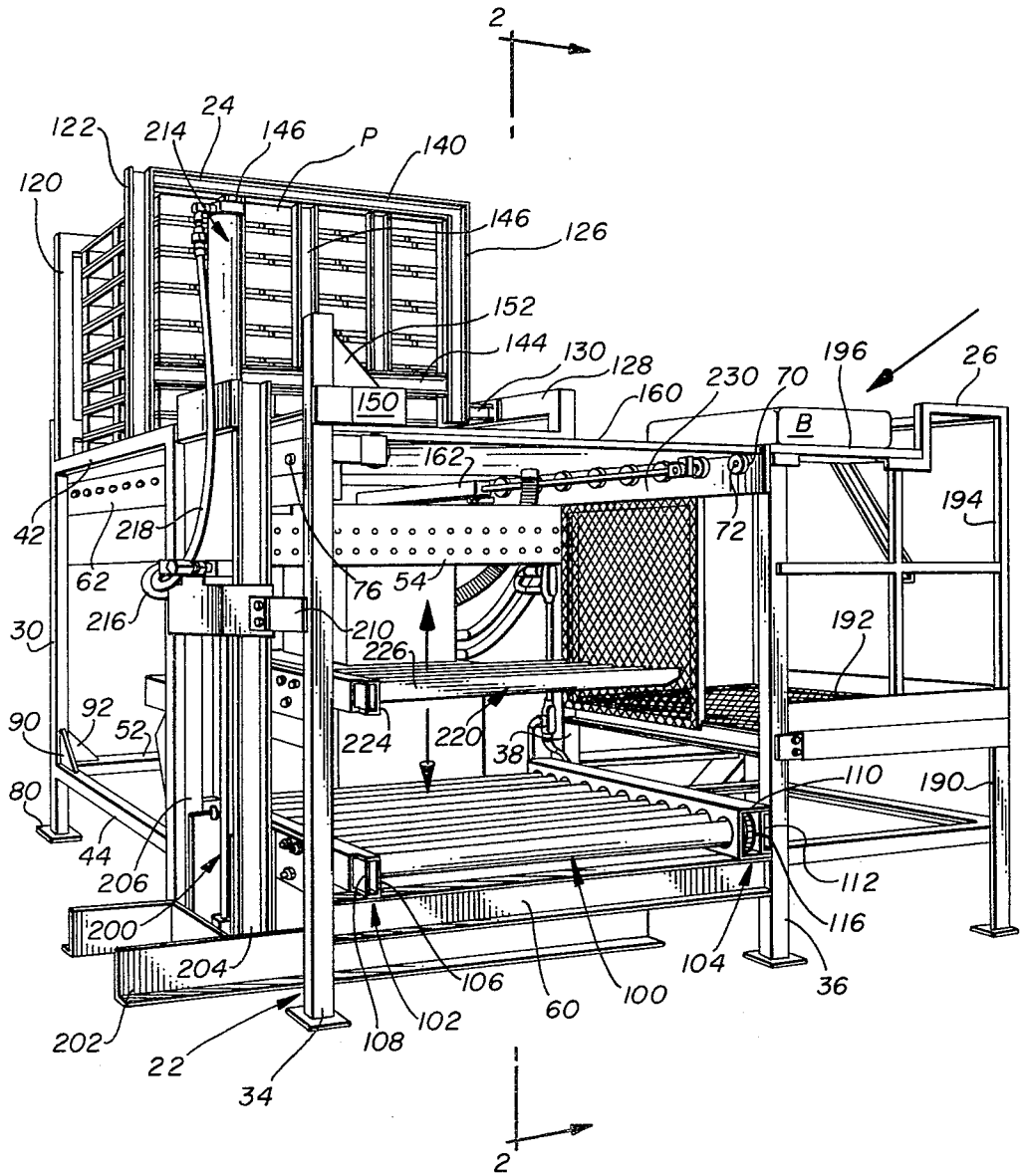
FIG. 1 is a perspective view of the palletizer according to the present invention.
Figure 2:
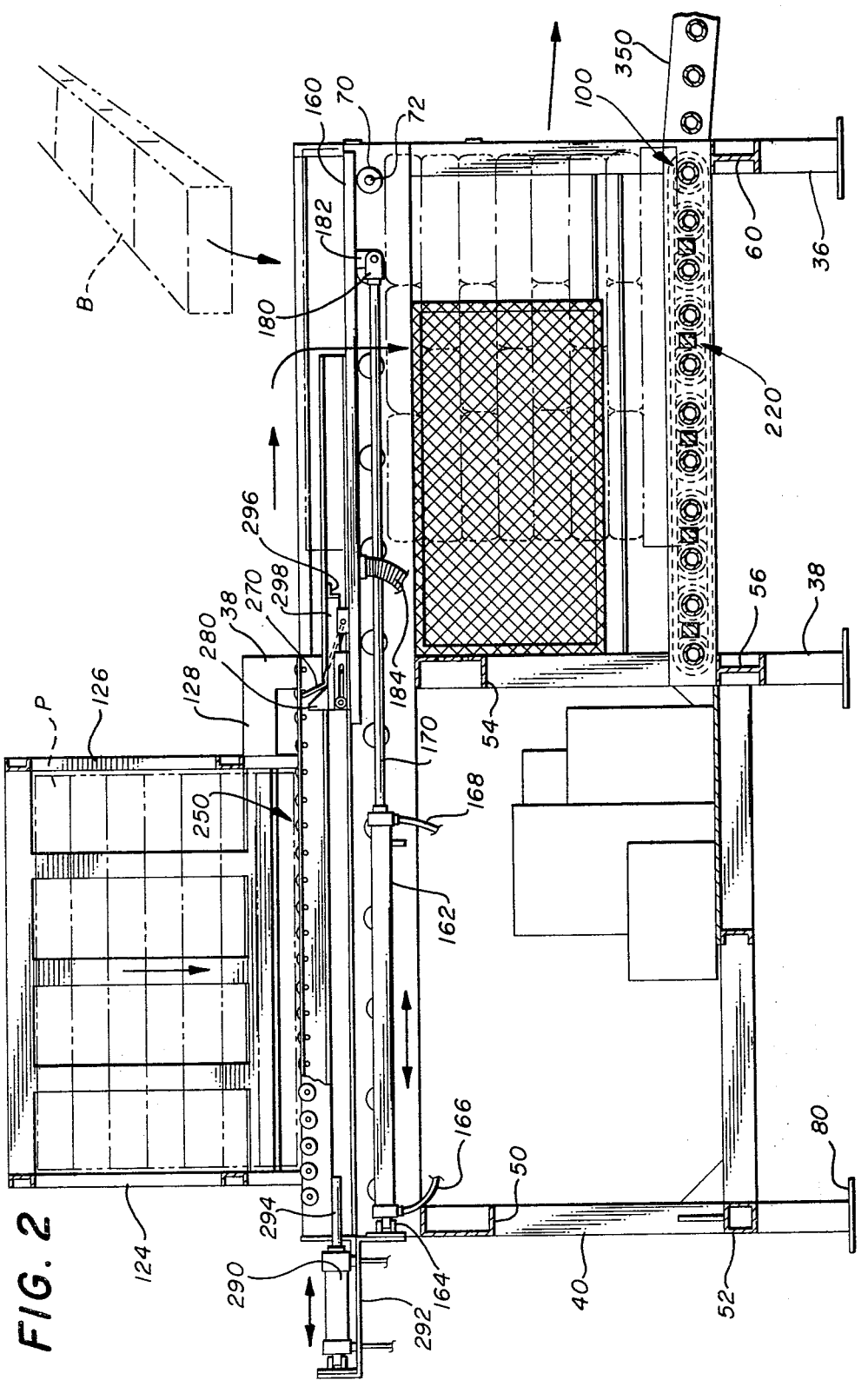
FIG. 2 is a vertical section view taken along lines 2—2 of FIG. 1 of the palletizer according to the present invention.

Referring to the drawings, and particularly FIGS. 1 and 2, a bag palletizer 20 includes generally a frame structure 22 supporting a pallet magazine structure 24 and a loading platform area 26. Frame structure 22 includes a plurality of vertical support legs 30, 32, 34, 36, 38 and 40. The upper ends of support legs 30 and 32 are joined by a tubular member 42 and the lower ends are joined by a similar member 44. Support legs 30 and 40 are interconnected by channel member 50 (FIG. 2) and lower tube member 52. Support legs 32 and 38 are connected by upper channel member 54 and lower I-beam 56 (FIG. 2). Leg supports 34 and 36 are connected by I-beam 60.

An upper roller plate 62 is attached along the upper ends of support legs 30, 32 and 34. Similarly, an upper roller plate 64 is attached between the upper ends of support legs 36, 38 and 40. A plurality of loading plate rollers 70 are mounted plate 64 by shafts 72. Similar rollers are mounted for rotation to plate 62 using shafts 76.

Each support leg 30, 32, 34, 36, 38 and 40 has a foot plate 80 welded to the lower end. Appropriate gusset plates are welded between the various components such as gusset plates 90 and 92 between support leg 30 and horizontal tubular member 44 and between support leg 30 and lower tube member 52.

A roller assembly 100 is mounted within the frame structure 22 on I-beams 56 and 60. Roller assembly 100 includes end assemblies 102 and 104. End assembly 102 consists of channel 106 mated with an end plate 108 to form a box beam. End assembly 104 includes a pair of channels 110 and 112 also defining a box beam. Rollers 114 are rotatably supported by end assemblies 102 and 104 and each roller has a sprocket attached to the end received within end assembly 104. A chain 116 engages these sprockets. Roller assembly 100 is driven by driving one of the sprockets using an electric motor or other power source (not shown).

Pallet magazine 24 includes upstanding legs 120 and 122 supported from tubular member 42 and upstanding legs 124 (FIG. 2) and 126 supported from horizontal beam 128 by channels 130. Beam 128 is supported between support leg 38 and a horizontal beam supported below beam 128 between support legs 38 and 40. The upper ends of legs 122 and 126 are connected by a channel 140, and a channel 144 is attached between legs 122 and 126 near their lower ends. Vertical support channels 146 are attached between horizontal channels 140 and 144. The side of pallet magazine 24 between legs 120 and 122 is free of any support structure, thereby being opened to permit the stacking of a plurality of pallets P therein as shown.

A stop arm 150 is fixedly attached to support leg 32. A gusset 152 is welded between arm 150 and support leg 34 to add rigidity and strength to the stop arm.

Referring to FIG. 1 in conjunction with FIG. 2, a loading plate 160 is received for reciprocating movement on rollers 70 attached to plate 64 and the rollers attached to plate 62 on the opposite side of frame structure 22. The movement of loading plate 160 between an extended position shown in FIG. 2 and a retracted position is accomplished by a hydraulic cylinder 162. Hydraulic cylinder 162 is attached at its rearward end by an appropriate bracket 164 to the frame structure 22 and has a fluid supply line 166 and a fluid return line 168 communicating with the cylinder. Hydraulic cylinder 162 has an extendable piston 170 which is attached by a fitting 180 to a lug 182 extending from the lower wall of loading plate 160.

Loading plate 160, as will be described hereinafter in greater detail, has an upper and lower surface and side walls defining an air chamber therein. Forced air is provided to the loading plate by way of air duct 184. Air supply to air duct 184 is provided through an appropriate air supply not shown.

Referring still to FIGS. 1 and 2, a loading platform area 26 is attached to frame structure 22 at support legs 36 and 38. This assembly includes an appropriate base frame structure 190 with a grid flooring 192 mounted thereon. An extended frame structure 194 is supported thereabove to provide a platform 196 for receiving bags of material, such as bag B shown in FIG. 1. An appropriate conveyor system for providing bags to platform 196 is also used in the present invention but is not shown in the drawings.

A fork assembly 200 is provided and includes a base 202 supporting upstanding channels 204 and 206. These channels are attached to support legs 32 and 34 by appropriate straps 210. A fork actuating cylinder assembly 212 is mounted between upstanding channels 204 and 206. The actuating cylinder includes a cylinder end 214 which is supplied by hydraulic fluid through lines 216 and 218 and a piston 220 which is actuated to move downwardly or upwardly as required. Piston 220 is attached to a fork assembly 222 which includes an end frame 224 having a plurality of arms 226 extending perpendicularly therefrom. End 224 and arms 226 are made to nest within roller assembly 100 when the fork assembly is in its lowermost position. An appropriate controller is provided for actuating the fork actuating cylinder to raise and lower the fork assembly during the operation of the present invention. As is seen in FIG. 1, a light sensor 230 is mounted within plate 64 and a light emitter (not shown) is mounted within plate 62 opposite sensor 230. The emitter and sensor, in conjunction with the actuator for the fork actuating cylinder, control the positioning of the fork assembly as will be described hereinafter in greater detail. The fork assembly may also be manually controlled in the operation.

Referring now to FIG. 2 in conjunction with FIGS. 3 and 4, pallets P are positioned on a live roller assembly 250. Roller assembly 250, as is seen in FIG. 2, includes a pair of spaced frames 252 and 254 for receiving a plurality of rollers 256 and 258, respectively, therebetween. These rollers are positioned below pallet magazine 24 and the lowermost pallet rests atop rollers 256 and 258. Frames 252 and 254 are supported from frame structure 22 by appropriate angles such as angles 260 shown in FIG. 3.

The mechanism for engaging and withdrawing the lowermost pallet P is shown in FIGS. 3 through 6. This structure includes an actuating arm 270 which is pivotally secured to loading plate 160 by pivot pin 272 engaged through a bracket fitting 274. Actuating arm 270 has a dog leg end 276 remote from its point of pivoting at bracket 274. Dog leg end 276 rests upon a sliding wedge 280 which is guided by a pair of angle rails 282 positioned on either side thereof. Angle rails 282 have a longitudinal slot for receiving a guide pin 284 extending from the side of wedge 280.

A hydraulic cylinder 290 is supported on a bracket 292 immediately behind wedge 280 and has a piston 294 which is extendable to slide wedge 280 from its rearwardmost position shown in FIG. 4 to its forwardmost position shown in FIG. 5. As wedge 280 is moved forwardly, it engages actuating arm 270, causing the arm to be raised from the position shown in FIG. 4 to the position shown in FIG. 5. In its raised position, the actuating arm 270 engages the lowermost pallet P as loading plate 160 is moved forwardly.

As is seen in FIGS. 1 and 6, the lowermost pallet P is removed from pallet magazine 24, being slid below horizontal channel 144 on roller assemblies 250. As the loading plate 160 moves to its most extended position, shown in FIG. 1, lowermost pallet P falls from roller assemblies 250 onto the loading plate. At the end of the stroke of cylinders 166, a U-shaped bumper 298 which extends from and in front of wedge 280 engages an angle 296. This engagement with angle 296 results in retraction of wedge 280, to the position shown in FIG. 2, thereby allowing actuating arm 270 to rotate downwardly.

In this way, actuating arm 270 is moved below pellets P such that upon the retraction of loading plate 160, the actuating arm does not engage the pallets stacked within the pallet magazine. Simultaneously, the pallet resting on loading plate 160 engages the roller assembly frame preventing its retraction as will be described hereinafter in greater detail.

Referring to FIG. 7, it can be seen that loading plate 160 includes a lower skin 310 and an upper skin 312 having apertures therein. A side wall 314 is mounted around the circumference of the plate to define an inner chamber 316. An inlet is defined by a circular flange 320 which is attached to lower skin 310 at a opening in the lower skin 310 and receives the air duct 184 (FIG. 4) for communicating air to the inner chamber for ejection through the plurality of ports 322 in upper skin 312.

In operation of the palletizer and assuming that the machine is just beginning operation, loading plate 160 is retracted to the position shown in FIG. 4 by the retraction of cylinders 162. Hydraulic cylinder 290 is actuated to extend piston 294, thereby advancing wedge 280 below actuating arm 270. Actuating arm 270 is raised from the position shown in FIG. 4 to the position shown in FIG. 5. Cylinder 162 is then actuated, either in time sequence or manually, to extend piston 170 thereby moving loading plate 160 on rollers 70. As loading plate 160 is moved outwardly from beneath pallet magazine 24, the lowermost pallet P is drawn with the plate, the pallet being moved on roller assemblies 250. This movement is shown in progress in FIG. 6. As the loading plate reaches the end of its outward movement, pallet P is dropped from roller assemblies 250 onto the plate. Simultaneously therewith, U-shaped bumper 298 extending from wedge 280 engaging angle 296 to move wedge 280 to its rearward position allowing actuating arm 270 to rotate downwardly. Throughout this process, air is directed through air duct 184 into loading plate 160 and is expelled through ports 322 in the upper surface of plate 160. Thus, pallet P rides on a cushion of air being ejected from the loading plate.

Fork assembly 222 has been raised to its uppermost position immediately below loading plate 160. Loading plate 160 is then retracted to the position shown in FIG. 4. Pallet P is prevented from moving to the retracted position by engaging the frame of the roller assembly 250. The pallet is therefore loaded onto fork assembly 222. Upon retraction of loading plate 160, the fork assembly with the pallet P loaded thereon is lowered until the beam of light emitted from the light emitter on plate 62 is sensed by the sensor 230.

In this way, the upper surface of pallet P is positioned just below loading plate 160, and the structure used in extending and retracting this plate. The loading plate is then extended again, without actuating cylinder 290 which would otherwise raise actuating arm 270. With the loading plate in its extended position, bags B are loaded onto the plate as desired. The bags are moved, such as by conveyor, to platform 196 and thereafter moved by hand, in a desired arrangement, on loading plate 160. As a result of the ejection of forced air from ports 322 in the upper surface of loading plate 160, movement of the bags is greatly facilitated.

With a layer of bags loaded onto loading plate 160, cylinder 162 is actuated to retract the loading plate causing the bags to move from the plate onto the pallet positioned therebelow. Again, as a result of the ejection of air through the apertures in the upper surface of loading plate 160, the bags easily move from the plate onto the pallet therebelow. Movement of the bags with the plate is prevented as a result of engagement of the bags with the forward end of the frame of roller assemblies 250. Again, roller assembly 250 is lowered until light from the emitter in plate 62 is sensed by light sensor 230. The loading plate is again extended and a layer of bags is received thereon. Retraction of the loading plate again deposits a layer of bags onto the pallet and first layer of bags positioned immediately therebelow.

This process is continued until a desired number of layers of bags is positioned on pallet P. Then, fork assembly 222 is lowered to its lowermost position nested within roller assembly 100 and the pallet is deposited onto the roller assembly. In that the roller assembly 100 provides driven rollers, the pallet is moved off of the roller assembly onto live rollers 350 shown in FIG. 2. Live rollers 350 are deleted from FIG. 1 for purposes of clarity.

The movement of fork assembly 222 to its nested position within roller assembly 100 activates hydraulic cylinder 290 to extend piston 294. This advances wedge 280 causing the positioning of actuating arm 270 in a position to engage the then lowermost pallet in pallet magazine 24. At this point, the procedure is repeated as described above resulting in the loading of a pallet and then layers of bags onto fork assembly 222.

It will be appreciated that in the present invention, loading plate 160 acts not only to assist in the loading of layers of bags onto a pallet, but also serves to automatically withdraw the pallet initially from a pallet magazine and deposit the pallet onto the fork assembly. The pallet is deposited onto the fork assembly while the fork assembly is in its uppermost position thereby speeding the palletizing process. Further, loading plate 160 may be moving to its extended position drawing the lowermost pallet from the pallet magazine, while the fork assembly is moving from its lower position to its upper position ready to receive the pallet thereon. Moreover, the structure used to accomplish the ready positioning of and removal of pallets to the fork assembly is straightforward, providing a design which is free from complexity and therefore very reliable.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements without departing from the spirit of the invention.

I claim:

1. A bag palletizer comprising:
   a support frame including a pallet magazine for maintaining a stack of pallets therein,
   a loading plate mounted for reciprocating movement between a retracted position below the pallets in the pallet magazine to an extended position,
   a vertically movable fork support movable between an upper position immediately below said loading plate when said loading plate is in its extended position and a lower position,
   selectively actuating means associated with said loading plate for selectively engaging the lowermost pallet prior to movement of said plate to its extended position, and
   sequencing means for moving said loading plate from its retracted position to its extended position, withdrawing said lowermost pallet from said stack of pallets, retracting said plate to deposit said pallet on said fork support, lowering said fork support, extending said plate for receiving bags thereon and retracting said plate to load the bags on said pallet.

2. The bag palletizer according to claim 1 wherein said lowermost pallet is deposited on said fork support when said fork support is at its upper position.

3. The bag pelletizer according to claim 1 further comprising:
   means for sequentially lowering said fork support as said bags are deposited thereon, repositioning said loading plate thereover to receive more bags thereon and retracting said loading plate to deposit the bags on said pallet.

4. The bag palletizer according to claim 3 wherein said plate is formed with an inner chamber and a top surface having apertures therein to permit air communicated to the inner chamber to be ejected from the top surface of the plate to facilitate movement of the pallet and bags relative to the plate top surface.

5. The bag palletizer according to claim 1 wherein said means for moving said loading plate includes linear actuators for retracting said plate and further comprising means for blocking movement of the bag during retraction, thereby forcing said bags from said plate.

6. The bag palletizer according to claim 1 wherein said engagement means includes actuator means operated when said plate is in its retracted position for raising an engaging surface for contacting the lowermost pallet in the stack of pallets as said loading plate is moved to its extended position.

7. The palletizer according to claim 6 further comprising means for lowering said engagement arm prior to the complete retraction of said loading plate to its retracted position.

8. The bag palletizer according to claim 1 wherein said stack of pallets is stacked vertically one on top of the other and moves downwardly in the pallet magazine under the action of gravity.

9. An apparatus for loading bagged material onto a pallet comprising:
   a support frame including a pallet magazine for maintaining a stack of pallets therein,
   a loading plate mounted for reciprocating movement relative to said frame and below said pallets in said pallet magazine,
   means for selectively reciprocating said plate between a retracted position below said pallet magazine to an extended position,
   means associated with said plate for selectively engaging the lowermost pallet when said plate is in its retracted position such that said pallet is pulled from said pallet magazine when said plate is moved to its extended position,
   a vertically movable fork support positionable below said plate when in its extended position,
   arrest means for preventing retraction of said pallet upon movement of said plate from its extended position to its retracted position such that said pallet is dropped on said fork support,
   means for lowering said fork support such that the upper surface thereof is below said plate to permit moving said plate to its extended position for loading bag materials thereon,
   means for actuating said reciprocating means to retract said plate whereby said bag materials are deposited on said pallet,
   means for further lowering said fork support to deposit said pallet and bag materials on a conveyor means for removal from said fork support, and
   means associated with the lowering of said fork support for actuating the means for engaging the lowermost pallet for withdrawal of said then lowermost pallet from the pallet magazine.

10. The bag palletizer according to claim 9 wherein said lowermost pallet is deposited on said fork support when said fork support is at its upper position.

11. The apparatus of claim 9 wherein said means for lowering said fork support includes means for sequentially lowering said fork support as said bags are deposited thereon, repositioning said loading plate over said fork support to receive more bags thereon and moving said loading plate to deposit the bags on said pallet or on bags which have been positioned on said pallet.

12. The apparatus according to claim 9 wherein said plate is formed with an inner chamber and a top surface having apertures therein to permit air communicated to the inner chamber to be ejected from the top surface of the plate to facilitate movement of the pallet or bags relative to the plate upper surface.

13. The apparatus according to claim 9 wherein said means for selectively engaging the lowermost pallet includes an actuator arm operated when said plate is in its retracted position for raising an engaging surface, by positioning a slideable wedge thereunder, for contacting said lowermost pallet as said loading plate is moved to its extended position.

14. The apparatus according to claim 13 further comprising means for lowering said actuator arm prior to the complete retraction of said loading plate, said means comprising structure cooperating with movement of said plate to remove said wedge from beneath said actuator arm.

15. A method for stacking bagged material onto a pallet comprising:
  loading a plurality of pallets into a magazine with the lowermost pallet being positioned over the retracted position of a loading plate,
  engaging said lowermost pallet by actuating an engagement structure on said plate,
  moving said plate from its retracted position to an extended position, thereby withdrawing the lowermost pallet from an opening in the side of the pallet magazine,
  retracting said plate and depositing said pallet on a vertically movable fork structure therebelow,
  lowering said fork structure until said pallet is below the plane of said plate,
  extending said plate over said fork structure,
  loading bags on said plate, and
  retracting said plate and depositing said bags on said pallet therebelow.

16. The method according to claim 15 wherein said lowermost pallet is deposited on said plate when said plate is in its upper position.

17. The method according to claim 15 further comprising:
  successively loading bags on said loading plate,
  retracting said plate to deposit the bags on the pallet or bags therebelow, and
  lowering said fork structure to permit the movement of the loading plate over the pallet and bag arrangement to receive another load of bags thereon.

18. The method according to claim 17 further comprising:
  removing said pallet from said fork structure, and
  actuating said engagement structure prior to extension of said plate to engage the then lowermost pallet, thereby withdrawing said pallet from the magazine as said loading plate is extended.

19. The method according to claim 15 wherein the engaging of the lowermost pallet includes:
  operating a linear actuator to raise engagement structure on said plate such that said engagement structure contacts the lowermost pallet as the plate is moved from its retracted to its extended position.

20. The method according to claim 19 further comprising:
  lowering said engagement structure prior to the complete retraction of said plate.

21. The method according to claim 15 further comprising:
  ejecting air through apertures in the upper surface of said plate to facilitate movement of the pallet and bags thereover.

22. The method according to claim 15 further comprising:
  subsequently lowering the loaded pallet onto a removal means, and
  actuating engagement structure on said plate to contact the then lowermost pallet for withdrawal of the then lowermost pallet from the pallet magazine.

23. A bag palletizer comprising:
  a support frame including a pallet magazine for housing a stack of pallets therein, said pallet magazine supporting the lowermost pallet from movement downwardly out of the pallet magazine and comprising an opening in one side of said pallet magazine to permit the movement of the lowermost pallet out of the magazine through said opening,
  a loading plate mounted for reciprocating movement between a retracted position below the pallet in the pallet magazine to an extended position,
  a vertically-movable fork support, movable between an upper position immediately below said loading plate when said loading plate is in its extended position and a lower position,
  selectively actuatable means associated with said loading plate for selectively engaging the lowermost pallet prior to movement of said plate to its extended position whereby said lowermost pallet is drawn out of the side opening in said pallet magazine with said loading plate, and
  sequencing means for moving said loading plate from its retracted position to its extended position, withdrawing said lowermost pallet from said stack of pallets, retracting said plate to deposit said pallet on said fork support, lowering said fork support, extending said plate for receiving bags thereon, and retracting said plate to load the bags on said pallet.

* * * * *